United States Patent
Hirota et al.

(10) Patent No.: US 9,627,111 B2
(45) Date of Patent: Apr. 18, 2017

(54) MAGNETIC MEMBER AND ELECTRONIC COMPONENT

(75) Inventors: Yasutake Hirota, Chuo-ku (JP);
Kenichi Katsuma, Chuo-ku (JP);
Masatake Hirooka, Chuo-ku (JP);
Takayuki Hachida, Chuo-ku (JP)

(73) Assignee: Ferrotec Corporation, Chuo-ku (JP)

( * ) Notice: Subject to any disclaimer, the term of this patent is extended or adjusted under 35 U.S.C. 154(b) by 0 days.

(21) Appl. No.: 13/508,616

(22) PCT Filed: Nov. 9, 2010

(86) PCT No.: PCT/JP2010/069945
§ 371 (c)(1),
(2), (4) Date: May 8, 2012

(87) PCT Pub. No.: WO2011/055845
PCT Pub. Date: May 12, 2011

(65) Prior Publication Data
US 2012/0229238 A1 Sep. 13, 2012

(30) Foreign Application Priority Data

Nov. 9, 2009 (JP) .................................. 2009-256451
Sep. 27, 2010 (JP) .................................. 2010-215871

(51) Int. Cl.
*B82Y 25/00* (2011.01)
*H01F 1/00* (2006.01)
(Continued)

(52) U.S. Cl.
CPC .......... *H01F 1/0018* (2013.01); *B22F 1/0018* (2013.01); *B82Y 25/00* (2013.01);
(Continued)

(58) Field of Classification Search
CPC ...... H01F 1/0018; H01F 1/0054; B82Y 25/00
(Continued)

(56) References Cited

U.S. PATENT DOCUMENTS

2004/0253437 A1* 12/2004 Ingvarsson et al. .......... 428/329
2005/0087000 A1    4/2005 Coehoorn et al.
(Continued)

FOREIGN PATENT DOCUMENTS

CN      1608206 A    4/2005
CN    101103419 A    1/2008
(Continued)

OTHER PUBLICATIONS

Wikipedia, Superparamagnetism, no date, pp. 1-5.*
(Continued)

*Primary Examiner* — Ramon M Barrera
(74) *Attorney, Agent, or Firm* — Robert R. Deleault, Esq.; Mesmer & Deleault, PLLC (57) ABSTRACT

A magnetic member includes a plurality of superparamagnetic particles held by the magnetic member. Each of the plurality of superparamagnetic particles is formed with a particle size which is set at least such that a Neel relaxation time $\tau n$ in the each of the superparamagnetic particles becomes shorter than a cycle P of an alternating current magnetic field applied to the magnetic member ($\tau n < P$) when the magnetic member is used as an electronic component.

9 Claims, 9 Drawing Sheets

(51) Int. Cl.
*B22F 1/00* (2006.01)
*B82Y 30/00* (2011.01)
*H01F 3/08* (2006.01)

(52) U.S. Cl.
CPC ............ *B82Y 30/00* (2013.01); *H01F 1/0054* (2013.01); *H01F 1/0063* (2013.01); *H01F 3/08* (2013.01)

(58) Field of Classification Search
USPC ........................................................ 335/303
See application file for complete search history.

(56) References Cited

U.S. PATENT DOCUMENTS

| | | | |
|---|---|---|---|
| 2006/0028748 | A1 | 2/2006 | Coehoorn |
| 2006/0068203 | A1 | 3/2006 | Ying et al. |
| 2006/0142419 | A1* | 6/2006 | Xu et al. ................. 523/161 |
| 2008/0061264 | A1 | 3/2008 | Maeda et al. |
| 2008/0252289 | A1 | 10/2008 | Lenglet |
| 2011/0045174 | A1 | 2/2011 | Maeda et al. |
| 2012/0038360 | A1 | 2/2012 | Lenglet |

FOREIGN PATENT DOCUMENTS

| | | | |
|---|---|---|---|
| CN | 101160633 A | | 4/2008 |
| JP | 1003568 A | | 1/1989 |
| JP | 03163805 A | * | 7/1991 |
| JP | 3163805 A | | 7/1991 |
| JP | H03163805 A | | 7/1991 |
| JP | 4025102 A | | 1/1992 |
| JP | 4188705 A | | 7/1992 |
| JP | 2003315374 A | * | 11/2003 |
| JP | 2006505929 A | | 2/2006 |
| JP | 2006303298 A | | 11/2006 |
| JP | 2006310369 A | | 11/2006 |
| JP | 2009-511868 A | | 3/2009 |
| JP | 4310377 B1 | | 8/2009 |

OTHER PUBLICATIONS

WIPO translation of PCT Preliminary Report on Patentability for PCT/JP2010/069945.
PCT International Search Report for PCT/JP2010/069945 mailed Feb. 8, 2011.
English translation of Notice of Reasons for Rejection; issued Dec. 24, 2013 in co-pending application JPA 2010-215871; cited references were submitted in a prior IDS.
Chinese Office Action in CN Appl. No. 201080050372.5; mail date of Mar. 31, 2015; Applicant: Ferrotec Corporation; Title: Magnetic member and electronic parts.
Chinese Office Action in CN Appl. No. 201080050372.5; mail date of Jul. 17, 2014; Applicant: Ferrotec Corporation; Title: Magnetic member and electronic parts.
Japanese Patent Office office action dated Sep. 30, 2014 with English translation in copending Japanese application No. 2010-215871.
Office action, Korean Intellectual Property Office, dated Aug. 30, 2016.

* cited by examiner

MAGNETIC MEMBER AND ELECTRONIC COMPONENT

CROSS-REFERENCE TO RELATED APPLICATIONS

This international application claims priority based on Japanese Patent Application No. 2009-256451 filed Nov. 9, 2009 in the Japan Patent Office and Japanese Patent Application No. 2010-215871 filed Sep. 27, 2010 in the Japan Patent Office, the entire contents of which are incorporated herein by reference.

TECHNICAL FIELD

The present invention relates to a magnetic member.

BACKGROUND ART

Recently, as shown in the Patent Document 1 below, for example, there is proposed an electronic component (a magnetic sensor) made up of a magnetic member in which a plurality of superparamagnetic particles are dispersed in a solid.

PRIOR ART DOCUMENTS

Patent Document

Patent Document 1: Published Japanese Translation of PCT International Publication for Patent Application No. 2009-511868

SUMMARY OF THE INVENTION

Problems to be Solved by the Invention

Since a position of each of the superparamagnetic particles is held in the above-mentioned magnetic member in a solid form, even when an alternating current magnetic field is externally applied to the magnetic member when in use, displacement of the superparamagnetic particles themselves, i.e., magnetization and demagnetization caused by the Brownian mechanism, does not occur. In this case, magnetic response of the superparamagnetic particles depends on displacements of magnetic moments which exist inside the particles, i.e., on magnetization and demagnetization caused by the Neel mechanism.

However, in the above-mentioned magnetic member, when a cycle P of the alternating current magnetic field to be externally applied to the magnetic member when in use is shorter than a time (a relaxation time) $\tau$ required for the magnetization and demagnetization caused by the Neel mechanism, the magnetic response of the superparamagnetic particles cannot follow up the cycle P. As a result, the above-mentioned magnetic member lost superparamagnetic characteristics to produce magnetic hysteresis in some cases.

Therefore, the object of the present invention is to provide a magnetic member which is prevented from losing superparamagnetic characteristics to produce magnetic hysteresis when in use.

Means for Solving the Problems

The first aspect of the present invention in order to solve the above problem is a magnetic member which includes a plurality of superparamagnetic particles held by the magnetic member. Each of the plurality of superparamagnetic particles is formed with a particle size which is set at least such that a Neel relaxation time $\tau n$ in the each of the superparamagnetic particles becomes shorter than a cycle P of an alternating current magnetic field applied to the magnetic member when the magnetic member is used as an electronic component ($\tau n < P$).

In the magnetic member configured as above, each of the plurality of superparamagnetic particles is held. Therefore, when a signal is externally applied to the magnetic member when in use, displacements of the superparamagnetic particles themselves, i.e., magnetization and demagnetization caused by the Brownian mechanism, are limited. For this reason, a magnetic response of a superparamagnetic particle depends on displacement of a magnetic moment which exists inside the particle, i.e., on magnetization and demagnetization caused by the Neel mechanism.

At this time, a time (a relaxation time) $\tau$ required for magnetization and demagnetization caused by the Neel mechanism is delayed in accordance with a particle size of the superparamagnetic particle. In the structure according to the first aspect, the particle size of each of the superparamagnetic particles is set at least such that a Neel relaxation time $\tau n$ in each of the superparamagnetic particles is shorter than a cycle P of a signal applied to the magnetic member when in use ($\tau n < P$). Therefore, the cycle P of the alternating current magnetic field to be externally applied to the magnetic member when in use does not become shorter than the above relaxation time $\tau$, and the magnetic response does not fail to follow up the cycle P. As a result, magnetic hysteresis does not occur.

In the magnetic member according to the first aspect, in order to hold each of the superparamagnetic particles, for example, each of the superparamagnetic particles may be directly or indirectly adhered to one another so that displacement is suppressed, or may use some sort of base material so that displacement is suppressed.

Specifically, for example, the magnetic member according to the first aspect may be configured as a magnetic member according to a second aspect of the present invention described below. In the magnetic member according to the second aspect, each of the superparamagnetic particles is held in a state where displacement caused by the Brownian mechanism is limited, by dispersing each of the superparamagnetic particles in a base material capable of suppressing displacement caused by the Brownian mechanism.

According to the magnetic member configured as above, each of the superparamagnetic particles can be held in a state where displacement caused by the Brownian mechanism is limited by dispersing each of the superparamagnetic particles in the base material. Also, in the magnetic member according to the second aspect, in order to disperse each of the superparamagnetic particles in a solid-state base material, the magnetic member according to the second aspect may be configured as, for example, a magnetic member according to a third aspect.

In the magnetic member according to the third aspect, the base material is a non-magnetic member. Each of the superparamagnetic particles is dispersed in the base material which is liquefied. Then, the base material is solidified to hold each of the superparamagnetic particles.

According to the magnetic member configured as above, each of the superparamagnetic particles is dispersed in the liquefied member, and then the resultant member is solidified, so that each of the superparamagnetic particles can be dispersed in the solid-state base material.

Also, in the magnetic member according to the third aspect, each of the superparamagnetic particles may have, like a magnetic member according to a fourth aspect, a non-magnetic coating layer formed on a surface thereof.

According to the magnetic member configured as above, since the non-magnetic coating layer is formed on each of the superparamagnetic particles, affinity between the superparamagnetic particles and the base material can be improved when each of the superparamagnetic particles is dispersed in the liquefied base material. Thus, each of the superparamagnetic particles can be surely held in the solidified base material.

Also, the fifth aspect of the present invention is an electronic component which includes a magnetic core. The magnetic member according to any one of the first to fourth aspects is used in the magnetic core. According to this electronic component, the operation and effect similar to those of any one of the first to fourth aspects can be obtained.

This electronic component may be used as any one of a magnetic sensor, a chip antenna, a transformer, and an inductor.

BRIEF DESCRIPTION OF THE DRAWINGS

FIGS. 3A and 3B are a diagram showing a first example of a magnetic sensor for detecting a current, to which a magnetic member according to the present invention is applied.

EXPLANATION OF REFERENTIAL NUMERALS

1 ... magnetic member, 12 ... exciting coil, 14 ... detecting coil, 18 ... conductive wire, 2 ... magnetic member, 22 ... gap, 24 ... Hall element, 28 ... conductive wire, 3 ... magnetic member, 32 ... balancing coil, 34 ... gap, 36 ... Hall element, 38 ... conductive wire, 4 ... magnetic member, 42 ... linking magnetic path, 44 ... exciting coil, 46 ... detecting coil, 48 ... conductive wire, 5 ... magnetic member, 52 ... conductive wire, 7 ... magnetic member, 72 ... grounding conductor, 74 ... antenna conductor, 100 ... transformer, 110 ... magnetic member, 200 ... inductor, 210 ... magnetic member, L1, L2, L3 ... winding wire.

MODE FOR CARRYING OUT THE INVENTION

Embodiments of the present invention will be described below with reference to the drawings.
(1) Characteristics of a Magnetic Member A magnetic member is a member which holds each of a plurality of superparamagnetic particles, and which constitutes a part of an electronic component. A particle size of each of the superparamagnetic particles is set in accordance with magnetic response speed.

Figure 1:
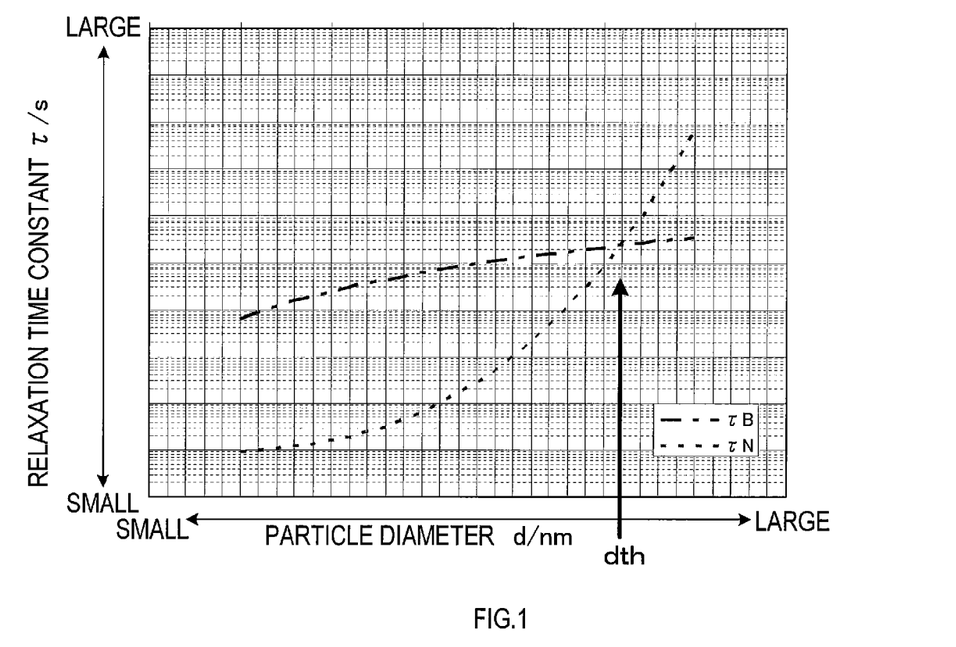
FIG. 1 is a graph showing a relationship between particle size of a superparamagnetic particle and relaxation time.

The magnetic response is caused by the Brownian mechanism in which a particle itself turns over and by the Neel mechanism in which magnetic spin in a particle turns over. As shown in FIG. 1, the magnetic response speed depends on the time (a relaxation time) $\tau$ that it takes for the turnovers to occur respectively in each of the Brownian mechanism and the Neel mechanism.

The relaxation time $\tau$ becomes larger in accordance with a particle size d of a superparamagnetic particle. However, a fluctuation range in accordance with the particle size is larger in a relaxation time $\tau n$ caused by the Neel mechanism than in a relaxation time $\tau b$ caused by the Brownian mechanism. Accordingly, the relaxation time $\tau n$ is smaller than the relaxation time $\tau b$ until the particle size exceeds a certain particle size dth, while the relaxation time $\tau n$ is larger than the relaxation time $\tau b$ after the particle size exceeds the particle size dth. In other words, unless the particle size does not exceed the particle size dth, the magnetic response is faster in the Neel mechanism than in the Brownian mechanism, so that the magnetic response caused by the Neel mechanism predominates. On the other hand, when the particle size exceeds the particle size dth, the magnetic response is slower in the Neel mechanism than in the Brownian mechanism, so that the magnetic response in the Brownian mechanism predominates.

The relaxation time $\tau n$ caused by the Neel mechanism can be obtained by Mathematical Formula 1 shown below, and depends on a temperature T, an anisotropy constant $\kappa$, and a particle size R, except a constant (including what is considered as a constant).

(Mathematical Formula 1)

$$\tau n = \sqrt{\frac{\pi}{2}} \cdot \tau 0 \cdot \exp\left(\frac{\Gamma}{\Gamma^{1/2}}\right) \qquad \text{(Mathematical Formula 1)}$$

$$\Gamma = \frac{\kappa \cdot VM}{k \cdot T}$$

Figure 2A:
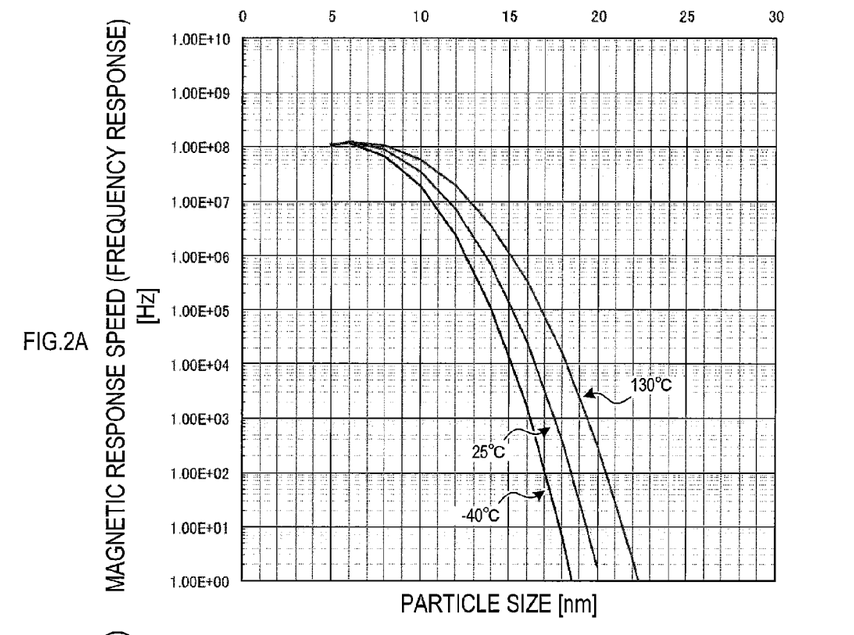
FIG. 2A is a graph showing a change of the relaxation time in accordance with the particle size with respect to each of a plurality of temperatures.
Figure 2B:
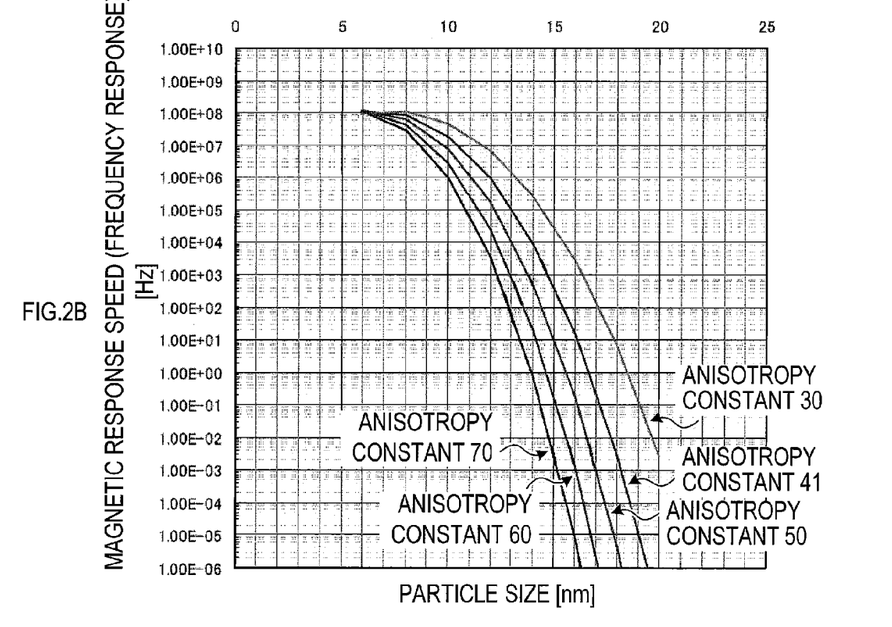
FIG. 2B is a graph showing the relaxation time in accordance with the particle size with respect to each of a plurality of anisotropy constants.

$\kappa$: Anisotropy constant [J/m$^3$]
VM: Magnetic volume in magnetic particle [m3] (generally $4\pi R^3/3$)
k: Boltzmann constant ($1.38 \times 10^{-23}$ J/K)
T: Absolute temperature [K]
$\tau 0$: Reference relaxation time
(=m/($\beta \cdot \gamma \cdot k \cdot Y$); Constant in accordance with material)
m: Magnetic moment of particle
$\beta$: Dimensionless damping parameter (approx. 0.01)
$\gamma$: Gyromagnetic ratio of electron FIG. 2A is a graph showing a change of the relaxation time τn in accordance with a particle size R with respect to each of a plurality of temperatures T (−40° C. (approximately 233 K), 25° C. (approximately 298 K), 130° C. (approximately 403 K) in the present embodiment), based on Mathematical Formula 1. FIG. 2B is a graph showing the relaxation time τn in accordance with the particle size R with respect to each of a plurality of anisotropy constants κ (30, 41, 50, 60, and 70 in the present embodiment). In these examples, 10^(−9) sec is used as a reference relaxation time τ0 in a case where an iron oxide-based material is used as superparamagnetic particles.

As seen in these graphs, as the temperature T increases, or as the anisotropy constant κ decreases, the magnetic response (frequency response) for the same particle size R deteriorates in performance. Also, in a region where the particle size R is small to some extent, influence of differences in a temperature T and in an anisotropy constant κ is reduced. Therefore, by using the particle size R within this region, influence of a factor such as a temperature T, which is an external environment, and an anisotropy constant κ on the performance of magnetic response can be suppressed.

In view of the characteristics described above, in the present embodiment, the particle size of the superparamagnetic particle is set at least such that the Neel relaxation time τn in the superparamagnetic particle becomes shorter than a cycle P of an alternating current magnetic field applied to the magnetic member when the magnetic member is used as an electronic component (τn<P).

Also, in the magnetic member according to the present embodiment, each of the superparamagnetic particles is held so that displacement caused by the Brownian mechanism is limited (suppressed, in the present embodiment). More specifically, the magnetic member according to the present embodiment may be configured such that each of the superparamagnetic particles is held by directly or indirectly adhering to one another. As used herein, the term "indirectly adhering" means adhering with a coating film formed on a surface of the superparamagnetic particle or with some sort of media intervening.

Also, the magnetic member according to the present embodiment may be configured such that each of the superparamagnetic particles is dispersed in a base material capable of suppressing displacement caused by the Brownian mechanism, so that each of the superparamagnetic particles is held in such a manner as to limit the displacement caused by the Brownian mechanism. In this case, the magnetic member may use a non-magnetic member (for example, resin materials, ceramics, etc.) as a base material. Each of the superparamagnetic particles may be dispersed in the non-magnetic member which is liquefied, to obtain certain positional relationship. Then, the resultant member may be solidified to hold the superparamagnetic particles. If displacement caused by the Brownian mechanism can be suppressed, a gel-like or high-viscosity liquid can be used as a base material.

The positional relationship between each of the superparamagnetic particles may be any relationship as long as the superparamagnetic characteristics between each of neighboring superparamagnetic particles are not reduced to a predetermined threshold or above. Thus, each of the superparamagnetic particles is dispersed in the base material such that a concentration in which the positional relationship is maintained is not exceeded.

Thus, when the superparamagnetic particles are dispersed in the base material, a non-magnetic coating layer is desirably formed on the surface of each of the superparamagnetic particles, in order to improve affinity between the superparamagnetic particles and the base material and realize sure hold. It is conceivable to use a surfactant, an oxide film, an organic material, a non-magnetic inorganic material, or the like, as a coating layer.

(2) Specific Applicable Structure

As an electronic component to which the above-mentioned magnetic member is applied, for example, the electronic components shown below are conceivable.

Figure 3A:
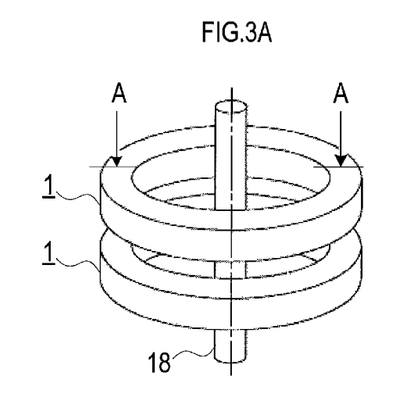
FIG. 3A is a perspective view of this sensor.
Figure 3B:
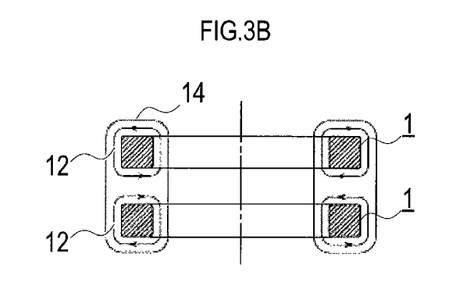
FIG. 3B is a cross-sectional view taken along line A-A in FIG. 3A.

First, as shown in FIGS. 3A and 3B, a magnetic sensor for detecting a current, which includes a plurality of magnetic members 1, a plurality of exciting coils 12, and a detecting coil 14, is conceivable. The plurality of magnetic members 1 are arranged in parallel to each other, and formed in a ring-like shape. Each of the plurality of exciting coils 12 is wound around the whole circumference of each of the magnetic members 1. The detecting coil 14 is wound around the plurality of magnetic members 1 in such a manner as to stride across each of the magnetic members 1. This magnetic sensor detects a current flowing through a conductive wire 18 which passes through a ring-like portion in the plurality of magnetic members 1.

Figure 4:
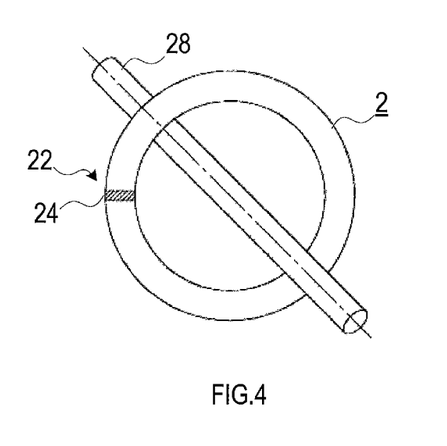
FIG. 4 is a diagram showing a second example of a magnetic sensor for detecting a current, to which a magnetic member according to the present invention is applied.

Also, as shown in FIG. 4, a magnetic sensor for detecting a current, which includes a magnetic member 2 and a Hall element 24, is conceivable. The magnetic member 2 is formed in a ring-like shape, and has a gap 22 formed in a part of the magnetic member 2. The Hall element 24 is disposed in the gap 22. This magnetic sensor detects a current flowing through a conductive wire 28 which passes through a ring-like portion in the magnetic member 2.

Figure 5:
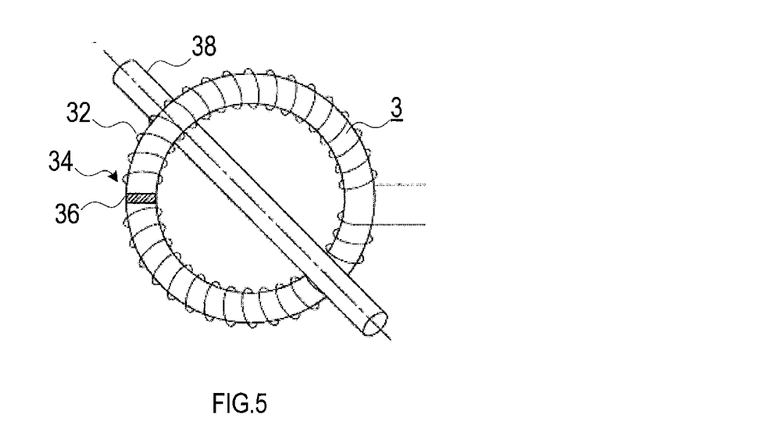
FIG. 5 is a diagram showing a third example of a magnetic sensor for detecting a current, to which a magnetic member according to the present invention is applied.

Also, as shown in FIG. 5, a magnetic sensor for detecting a current, which includes a magnetic member 3, balancing coil 32, and a Hall element 36, is conceivable. The magnetic member 3 is formed in a ring-like shape, and has a gap 34 formed in a part of the magnetic member 3. The balancing coil 32 is wound around the whole circumference of the magnetic member 3. The Hall element 36 is disposed in the gap 34 in the magnetic member 3. This magnetic sensor detects a current flowing through a conductive wire 38 which passes through a ring-like portion in the magnetic member 3.

Figure 6:
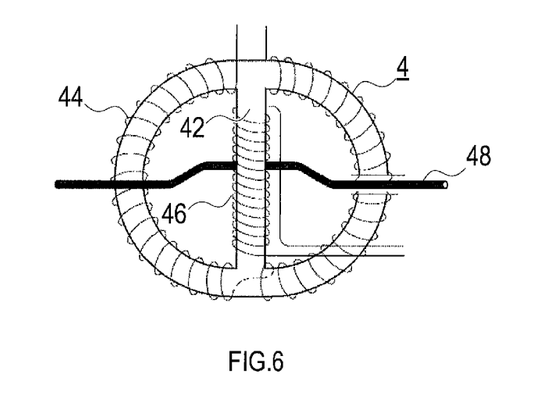
FIG. 6 is a diagram showing a fourth example of a magnetic sensor for detecting a current, to which a magnetic member according to the present invention is applied.

Also, as shown in FIG. 6, a magnetic sensor for detecting a current, which includes a magnetic member 4, a linking magnetic path 42, an exciting coil 44, and a detecting coil 46, is conceivable. The magnetic member 4 is formed in a ring-like shape. The linking magnetic path 42 provides a link in such a manner as to split a ring-like portion in the magnetic member 4. The exciting coil 44 is wound around the whole circumference of the magnetic member 4. The detecting coil 46 is wound around the whole length of the linking magnetic path 42. This magnetic sensor detects a current flowing through a conductive wire 48 which passes through the ring-like portion in the magnetic member 4 from one of the regions split by the linking magnetic path 42 to the other of the regions.

Figure 7:
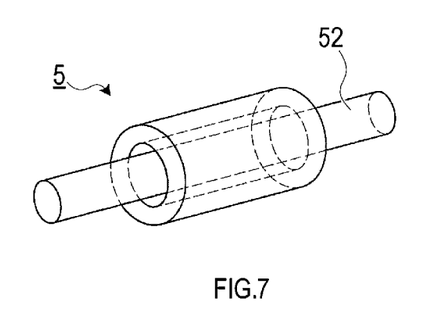
FIG. 7 is a diagram showing an EMI filter, to which a magnetic member according to the present invention is applied.

Also, as shown in FIG. 7, a ferrite bead, which is constituted by a magnetic member 5 formed in a tubular shape and used by passing a conductive wire 52 through a tubular portion, is conceivable. According to the ferrite bead, by using the magnetic member 5 having a high magnetic permeability for high frequency, even if high frequency noise such as a precipitous spike occurs in the conductor 52, the ferrite bead exhibits high impedance attributable to the magnetic permeability of the magnetic member 5 against the high frequency noise, thereby suppressing transmission of such a high frequency noise to the conductor 52.

The structure which can obtain the operation and effect similar to the above is not limited to a structure in which the conductor 52 passes through the tubular magnetic member 5 as described above, but may include, for example, a structure in which a conductor is wounded around a ring-like magnetic member, and a structure in which a spiral conductor is mounted into a column-like magnetic member.

Figure 8:
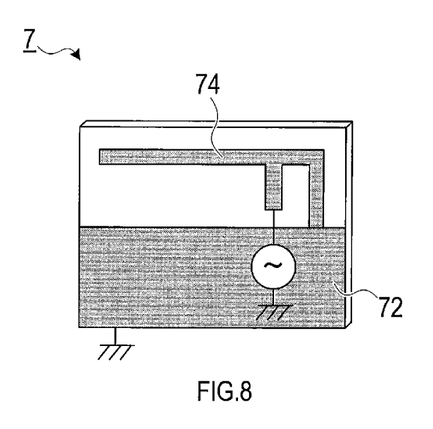
FIG. 8 is a diagram showing a chip antenna, to which a magnetic member according to the present invention is applied.

Also, as shown in FIG. 8, a chip antenna, which includes a rectangular, plate-like magnetic member 7, is conceivable. A grounding conductor 72 expanding in a left and right direction is provided in a lower region on the plate-like surface, and an antenna conductor 74 extending in a left and right direction is provided in the other region on the surface. In this embodiment, although the antenna conductor 74 is formed into a "F" shape, the shape as an antenna conductor is not limited to the "F" shape. Also, although one end side of the antenna conductor 74 is connected with the grounding conductor 72, the one end side is not necessarily connected with the grounding conductor 72.

It is to be understood that an electronic component to which the above-mentioned magnetic members are applied may include, other than the above-mentioned electronic components, for example, a transformer, an inductor, and other electronic components except a magnetic sensor.

Figure 9A:
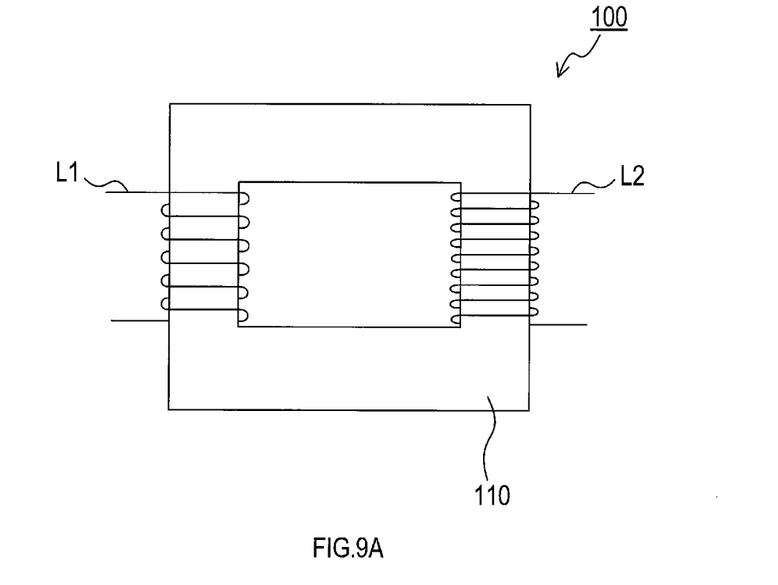
FIG. 9A is a diagram showing an example of a transformer, to which a magnetic member according to the present invention is applied.

Specifically, a transformer to which the above-mentioned magnetic members are applied may be formed, for example, as a transformer 100 shown in FIG. 9A, such that a winding wire L1 and a winding wire L2 wind around a ring-like magnetic member 110 with a quadrangle plane shape.

Figure 9B:
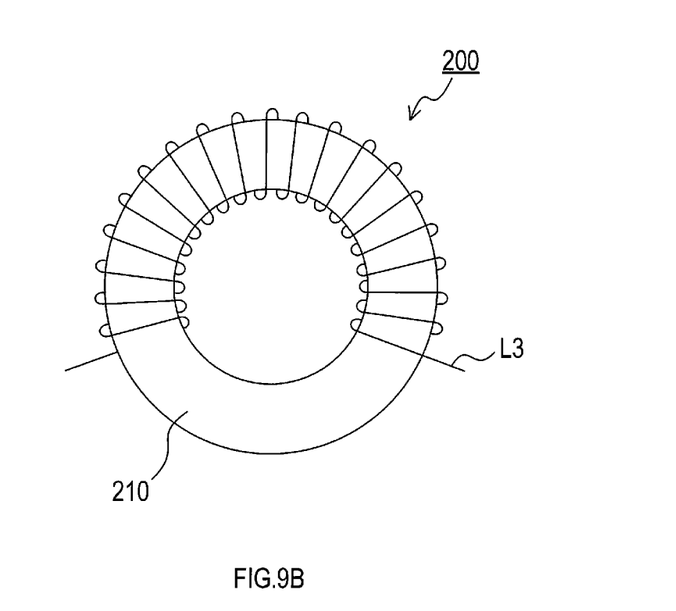
FIG. 9B is a diagram showing an example of an inductor, to which a magnetic member according to the present invention is applied.

Also, an inductor to which the above-mentioned magnetic member is applied may be formed, for example, as an inductor 200 shown in FIG. 9B, such that a winding wire L3 winds around a ring-like magnetic member 210.

(3) Operation and Effect

In the magnetic member configured as above, since each of the superparamagnetic particles is held, displacement of the superparamagnetic particles themselves, i.e., magnetization and demagnetization caused by the Brownian mechanism, is limited when a signal is externally applied to the magnetic member when in use. For this reason, magnetic response of the superparamagnetic particles depends on displacement of a magnetic moment which exists inside the particles, i.e., on magnetization and demagnetization caused by the Neel mechanism.

At this time, a time (a relaxation time) $\tau$ required for magnetization and demagnetization caused by the Neel mechanism is delayed in accordance with a particle size of the superparamagnetic particle. In the structure described above, the particle size of each of the superparamagnetic particles is set at least such that a Neel relaxation time $\tau n$ in the superparamagnetic particles is shorter than a cycle P of a signal applied when in use ($\tau n < P$). Therefore, the cycle P of an alternating current magnetic field to be externally applied when in use does not become shorter than the relaxation time $\tau$, and the magnetic response does not fail to follow up the cycle P. As a result, magnetic hysteresis does not occur.

Also, in the above embodiment, in a case where each of the superparamagnetic particles is dispersed in a base material capable of suppressing displacement caused by the Brownian mechanism, each of the superparamagnetic particles can be held in a state where each of the superparamagnetic particles is dispersed in the base material and displacement caused by the Brownian mechanism is limited.

Also, in the above embodiment, in a case where each of the superparamagnetic particles is dispersed while a base material consisting of a non-magnetic member is liquefied, and then the non-magnetic member is solidified, each of the superparamagnetic particles can be dispersed in a solid-state base material.

Also, in the above embodiment, in a case where a non-magnetic coating layer is formed on the surface of each of the superparamagnetic particles, existence of the non-magnetic coating layer can improve affinity between the superparamagnetic particles and the base material when each of the superparamagnetic particles is dispersed in the liquefied base material. Thus, each of the superparamagnetic particles can be surely held in the solidified base material.

The invention claimed is:

1. An electronic component comprising:
   a plurality of magnetic members in a state where an external magnetic field as an alternating current magnetic field is applied, wherein each of the plurality of magnetic members has a plurality of superparamagnetic particles which is held by the magnetic member wherein each of the plurality of superparamagnetic particles is formed with a particle size which is set at least such that an influence of a temperature in an external environment and an anisotropy constant on a performance of magnetic response of each of the superparamagnetic particles can be suppressed, and wherein the plurality of magnetic members is arranged in parallel to each other, each of the magnetic members being formed in a ring-like shape;
   a plurality of exciting coils each of which is wound around a whole circumference of each of the magnetic members;
   a detecting coil which is wound around the magnetic members in such a manner as to stride across each of the magnetic members; and
   the electronic component being configured to function as a sensor to detect a current flowing through a conductive wire which passes through a ring-like portion in each of the magnetic members.

2. The electronic component according to claim 1, wherein the particle size is further set such that a Neel relaxation time $\tau n$ in each of the superparamagnetic particles becomes shorter than a cycle P of the alternating current magnetic field ($\tau n < P$).

3. A magnetic member comprising a plurality of superparamagnetic particles which is held by the magnetic member, wherein each of the plurality of superparamagnetic particles is formed with a particle size which is set at least such that an influence of a temperature in an external environment and an anisotropy constant on a performance of magnetic response of each of the superparamagnetic particles can be suppressed.

4. The magnetic member according to claim 3, wherein the particle size is further set such that a Neel relaxation time $\tau n$ in each of the superparamagnetic particles becomes shorter than a cycle P of an alternating current magnetic field applied to the magnetic member ($\tau n < P$) when the magnetic member is used as an electronic component.

5. The magnetic member according to claim 4, wherein each of the superparamagnetic particles is dispersed in a base material capable of suppressing displacement caused by a Brownian mechanism so that each of the superparamagnetic particles is held in a state where the displacement caused by a Brownian mechanism is limited.

6. The magnetic member according to claim 5, wherein the base material is a non-magnetic member; and each of the superparamagnetic particles is dispersed in the non-magnetic member while the non-magnetic member is liquefied, and then the non-magnetic member is solidified, to hold the each of the superparamagnetic particles.

7. The magnetic member according to claim 5, wherein each of the superparamagnetic particles has a non-magnetic coating layer formed on a surface of each of the superparamagnetic particles.

8. An electronic component, comprising a magnetic core, wherein the magnetic member according to claim 3 is used as the magnetic core.

9. The electronic component according to claim 8, wherein the electronic component is used as any one of a magnetic sensor, a chip antenna, a transformer, and an inductor.

* * * * *